(12) United States Patent
Ormaza

(10) Patent No.: US 9,565,972 B1
(45) Date of Patent: Feb. 14, 2017

(54) ELECTRIC GRINDER HAVING LIGHTING MEANS AND A USB PORT FOR CHARGING

(71) Applicant: Manuel Ormaza, Miami, FL (US)

(72) Inventor: Manuel Ormaza, Miami, FL (US)

(73) Assignee: Manuel Ormaza, Miami, FL (US)

( * ) Notice: Subject to any disclaimer, the term of this patent is extended or adjusted under 35 U.S.C. 154(b) by 0 days.

(21) Appl. No.: 15/211,821

(22) Filed: Jul. 15, 2016

Related U.S. Application Data

(63) Continuation-in-part of application No. 15/202,569, filed on Jul. 5, 2016, now abandoned.

(51) Int. Cl.
| | |
|---|---|
| *A47J 42/30* | (2006.01) |
| *B02C 18/10* | (2006.01) |
| *B02C 23/16* | (2006.01) |
| *G01G 19/52* | (2006.01) |

(52) U.S. Cl.
CPC ............... *A47J 42/30* (2013.01); *B02C 18/10* (2013.01); *B02C 23/16* (2013.01); *G01G 19/52* (2013.01)

(58) Field of Classification Search
CPC .......... A47J 42/30; B02C 23/16; B02C 18/10; G01G 19/52
USPC ..................................................... 241/169.1
See application file for complete search history.

(56) References Cited

U.S. PATENT DOCUMENTS

| | | | | |
|---|---|---|---|---|
| 4,366,930 A | * | 1/1983 | Trombetti, Jr. | ....... A61J 7/0007 |
| | | | | 241/169 |
| 2015/0298136 A1 | * | 10/2015 | Dukat | ..................... A47J 42/14 |
| | | | | 241/24.1 |

FOREIGN PATENT DOCUMENTS

CN          202845122       *  4/2013

* cited by examiner

*Primary Examiner* — Mark Rosenbaum
(74) *Attorney, Agent, or Firm* — Christian Sanchelion

(57) ABSTRACT

The present disclosure discloses a grinder for grinding herbs, coffee beans, spices, tobacco, and other dried plants into particulates. The grinder comprises a body and a filter assembly. The filter assembly includes a mesh filter and is coupled at the bottom of the body. The body comprises a battery and blade coupled to a shaft, which, in turn is coupled to a motor. When the motor is run, the motor spins the blade, which, in turn grinds the herb into particulates. The particulates of herb are collected at a pollen catching cap after being filtered by the mesh filter. Further, the grinder can include a storage assembly to store or transport the particulates of the herb. The grinder can include a USB port to recharge the battery and a lighting means to provide visibility to a user operating the grinder.

12 Claims, 6 Drawing Sheets

ELECTRIC GRINDER HAVING LIGHTING MEANS AND A USB PORT FOR CHARGING

OTHER RELATED APPLICATIONS

The present application claims priority of provisional U.S. patent application Ser. No. 62/187,884 filed on Jul. 2, 2015, which is hereby incorporated by reference.

BACKGROUND OF THE INVENTION

Field of the Invention

The present disclosure generally relates to the grinding of herbs. More specifically, the present disclosure relates to an electric grinder for grinding herbs having lighting means, a USB charging port, and a pollen catcher amongst other novel features.

BACKGROUND

As known, a grinder is a mechanical device used for pulverizing herbs, spices, tobacco, and other dried plants into particulates. The herb grinded into the particulates is used in cooking or for other purposes. Typically, the grinders are operated either manually or electronically. The grinders operated electronically comprise a motor and a blade, both placed inside the grinder. Typically, the blade is screwed to the bottom of the grinder. In order to grind the herb, the herb is placed inside the grinder. When powered, the motor drives the blade, which, in turn grinds the herb.

When the herb is grinded it is at times difficult to take out. In order to take out the herb, the grinder has to be put upside down and tapped. At times, even though the herb grinder is put upside down, it remains difficult to take out the herb. The blade may cut hand of an operator trying to take out the herb from the grinder. Further, small particulates, or pollen, is very difficult to gather without a pollen catcher, and it is difficult to monitor the progress of the grinding without a lighting means. The present invention solves the above problems in a novel and efficient manner.

SUMMARY OF THE INVENTION

The above-mentioned problems are addressed by providing a grinder comprising a body and a filter assembly coupled to the body such that herb falls onto a pollen catcher and the herb is removed from the filter assembly without any difficulty.

In one aspect of the present disclosure, a grinder comprising a body and a filter assembly is disclosed. The filter assembly is coupled at the bottom of the body. In order to grind the herbs, the herbs are placed in the lid. The body comprises a blade coupled to a shaft, which, in turn is coupled to a motor. When the motor is actuated, the motor spins the blade that grinds the herb into particulates. The herb grinded is collected at bottom of the filter assembly. Subsequently, the filter assembly is detached from the body and the herb can be removed from the filter assembly.

In another aspect of the present disclosure, the grinder comprises a battery to power the motor. Further, the grinder comprises a USB connector, a light and an actuation button. The actuation button is used to actuate the motor.

In yet another aspect of the present disclosure, the grinder comprises a pollen catcher or a pollen catching cap that stores very fine particulates. The storage assembly comprises a top cap, a storage unit, and a bottom cap, to store and transport the herb.

The features and advantages described in this summary and in the following detailed description are not all-inclusive, and particularly, many additional features and advantages will be apparent to one of ordinary skill in the relevant art, in view of the drawings, and specification thereof. Moreover, it should be noted that the language used in the specification has been principally selected for readability and instructional purposes, and may not have been selected to delineate or circumscribe the inventive subject matter.

BRIEF DESCRIPTION OF DRAWINGS

In the following drawings, like reference numbers are used to refer to like elements. Although the following figures depict various examples of the invention, the invention is not limited to the examples depicted in the figures.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a grinder for grinding herb. The grinder comprises a body and a lid. The lid is coupled at the bottom of the body. In order to grind the herbs, at first, the herbs are placed in the lid. The body comprises a blade coupled to a shaft, which, in turn is coupled to a motor. When the motor is actuated, the motor spins the blade that grinds the herb into particulates. The herb grinded is collected at the bottom of the lid. Subsequently, the lid is detached from the body and the herb is removed from the lid. The various features and embodiments of the grinder are explained in conjunction with the description of FIGS. 1-6B.

Figure 1:
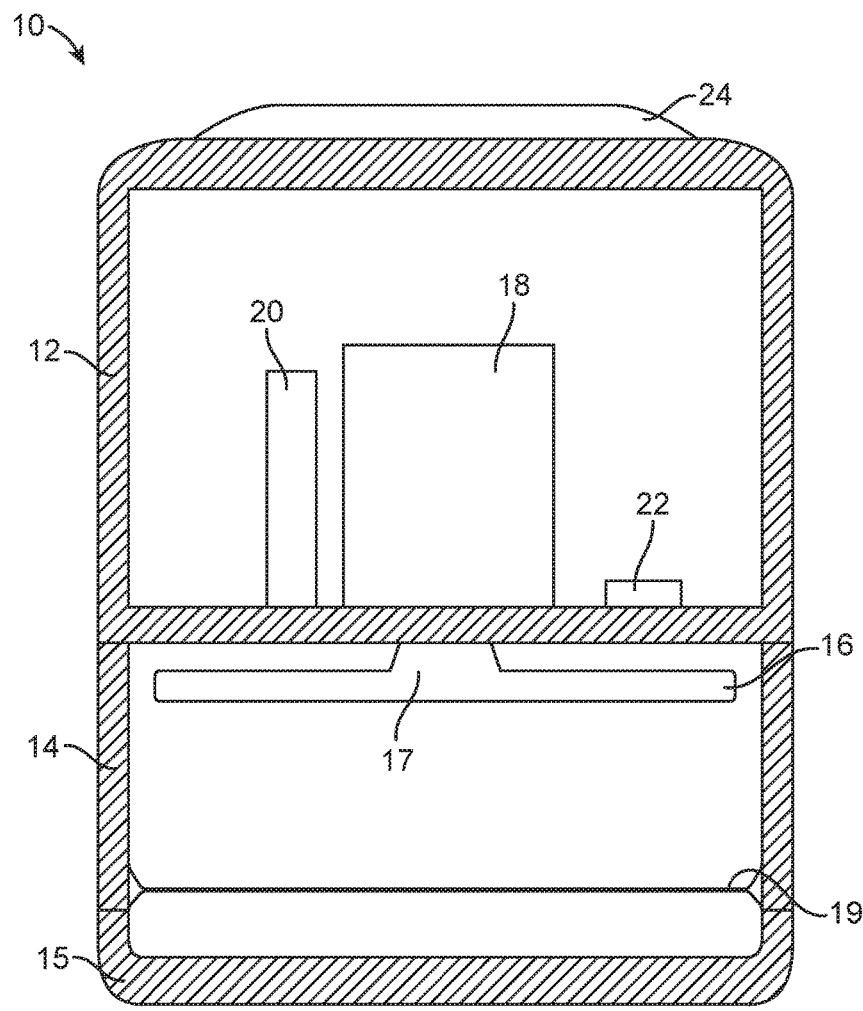
FIG. 1 is a cross-sectional view of grinder 10, in accordance with one embodiment of the present disclosure.
Figure 2:
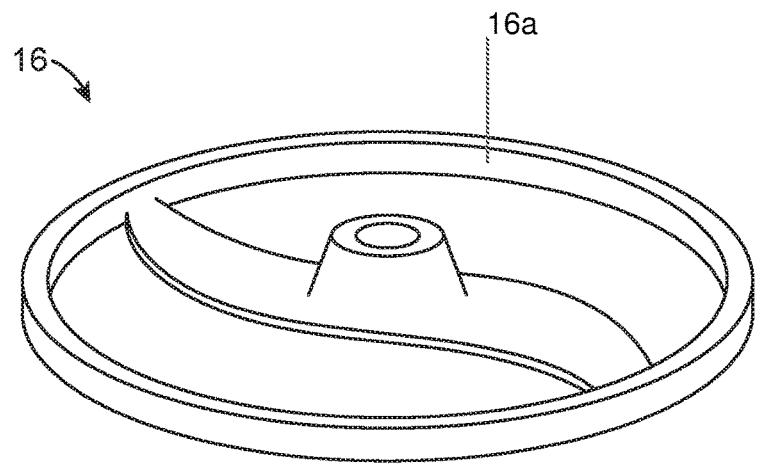
FIG. 2 shows blade 16, in accordance with one embodiment of the present disclosure.
Figure 3:
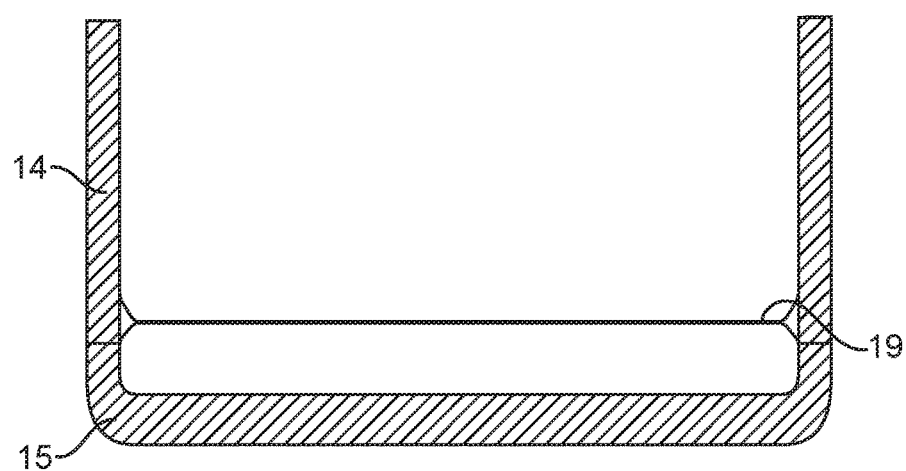
FIG. 3 is a cross-sectional view of filter assembly 14 comprising a mesh filter 19, in accordance with one embodiment of the present disclosure.

Referring to FIG. 1, a cross-sectional view of a grinder 10 for grinding herb is shown, in accordance with one embodiment of the present disclosure. The grinder 10 comprises a body 12 made up of plastic or a metal or any other suitable material comprising composites of various materials. The grinder 10 further comprises a filter assembly 14 placed at the bottom of the body 12. In one example, the filter assembly 14 may be coupled to the bottom of the body 12 temporarily by screwing, or by using magnets or by using any other mechanical means. The filter assembly 14 may further be connected to a pollen catching cap 15 at the bottom. In one example, the pollen catching cap 15 may be in a shape of a bowl to receive the pollen resulting from the grinded herbs. The body 12 further comprises a blade 16 coupled to a shaft 17, which in turn is coupled to a motor 18, through a hole (not shown) at the bottom of the body 12. Further, the blade 16 is coupled to the shaft 17 by a screw (not shown). The blade 16 may be made of any material (e.g., metal, plastic) suitable to shred herbs. Similarly, the screw may be made of any material suitable to rigidly attach the blade 16 to the shaft 17. In another example, the blade 16 may be coupled to the shaft 17 in various other means that are obvious to a person skilled in the art. The blade 16 may be made with different pitches and angles based on material e.g., herb, spices, coffee beans, tobacco used for grinding. The blade 16 may have single, tri, quad bladed tips. Further, the blade 16 may comprise teeth and pegs. Referring to FIG. 2, a blade 16 comprising dual bladed tip is shown, in accordance with one exemplary embodiment of the present disclosure. The blade 16 shown in FIG. 2 should not be construed as a limitation to shred the herbs, however other shapes are within the scope of the present disclosure. Blade 16 can also include a ring 16a that extends along the circumference of the bottom of body 12 that can be used to prevent blade 16 from jamming against the inner walls of body 12.

Referring back to FIG. 1, the filter assembly 14 may further comprise a mesh filter 19 placed substantially at the bottom of filter assembly 14. Mesh filter 19 can be used to catch the herb or the very fine particulates resulting from the grinding of the herbs so they are not lost or wasted. In other words, the mesh filter 19 is placed in between the filter assembly 14 and pollen catching cap 15. The motor 18 is electrically coupled to a battery 20 in order to power the motor 18. The battery 20 may be a rechargeable battery. Furthermore, the body 12 comprises a lighting member 22, to provide illumination while the grinder 10 is in use so a user can have more visibility of the grinding process. In one example, lighting member 22 may be provided at the bottom of the body 12 to provide illumination in the filter assembly 14 and in the pollen catching cap 15. It should be understood that lighting member 22 can be coupled to filter assembly 14 to provide illumination more directly therein. Lighting member 22 can be actuated using sensors that measure the amount of lighting in a given area and activate the light when the lighting levels in the area go below a certain threshold or lighting member 22 can be actuated with a button or similar means.

The grinder 10 further comprises an actuation button 24 provided on body 12. It should be understood that pressing/actuating the actuation button 24 results in turning on the motor 18, depressing the actuation button 24 results in stopping the motor 18. In one example, the actuation button 24 may include touch controls or biometric mechanism to operate the motor 18. The operation of the components presented above is explained in subsequent portions of the disclosure. In one example, the body 12 comprising the blade 16, the shaft 17, the motor 18, and the battery 20 may be provided as one unit. Filter assembly 14 having mesh filter 19 and pollen catching cap 15 may be provided as separate units.

Figure 4A:
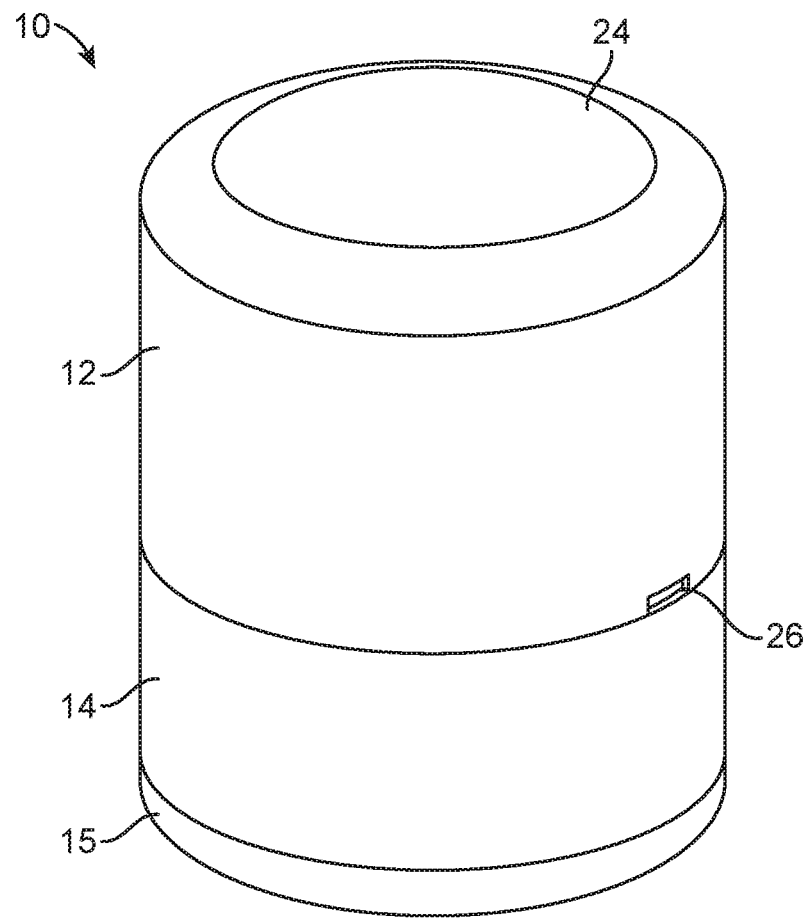
FIG. 4A is a perspective view of the grinder 10, in accordance with one embodiment of the present disclosure.
Figure 4B:
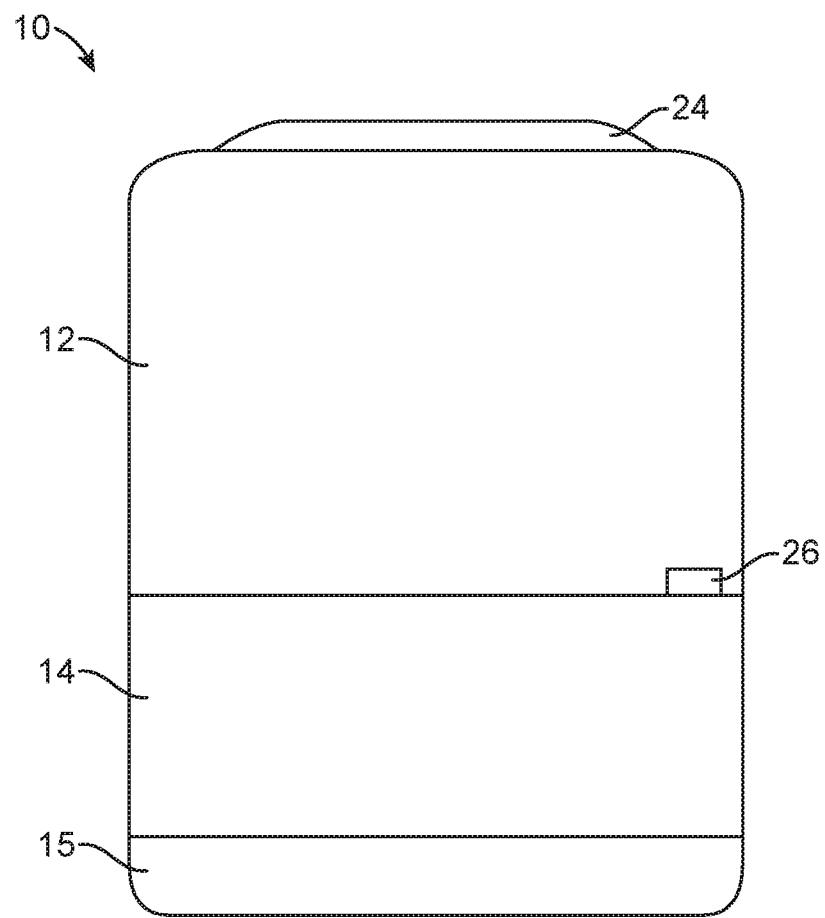
FIG. 4B is a side view of grinder 10, in accordance with one embodiment of the present disclosure.

Referring to FIG. 4A, a top perspective view of the grinder 10 is shown, in accordance with one embodiment of the present disclosure. As can be seen in FIG. 4A, the grinder 10 may further comprise a USB port 26, in accordance with one embodiment of the present disclosure. Specifically, FIG. 4A shows the USB port 26 provided on outer surface of the body 12. Further, referring to FIG. 4B, a side view of the grinder 10 showing the actuation button 24 and the USB port 26 is shown. Although the figures show that the actuation button 24 is provided on top and the USB port 26 is provided at (outer) side of the body, it should be understood that the actuation button 24 and the USB port 26 may be provided at other places, for example both the actuation button 24 and the USB port 26 may be provided at side of the body 12.

The USB port 26 is connected to the battery 20 and may be used to charge the battery 20. The battery 20 may be charged from a power source (not shown) through the USB port 26.

In addition, the grinder 10 may comprise an indicator (not shown) provided on surface of the body 12 to show current power level of the battery 20 with one or more colors according to predetermined power thresholds as well as on/off indicators showing when the grinder is being operated.

As presented above, the grinder 10 may be used to grind the herb. In order to grind the herb, the herb may be placed inside the filter assembly 14. At first, an operator may actuate the motor 18 by pressing the actuation button 24. Upon actuation, the motor 18 may draw power from the battery 20. Subsequently, the motor 18 spins the shaft 17, which, in turn spins the blade 16 to grind the herb placed inside filter assembly 14. As it is evident from the figures and the description above, the blade 16 grinds the herb. Subsequently, the herb falls onto the mesh filter 19. The mesh filter 19 filters the herb and allows the finer particulates or pollen of the herb to be collected in the pollen catching cap 15. A certain amount of the finer particulates from the herb can be caught by mesh filter 19 so that a user can collect that part of the herb as well. Subsequently, the filter assembly 14 along with the pollen catching cap 15 is detached from the body 12 and the herb is removed from pollen catching cap 15.

Figure 5:
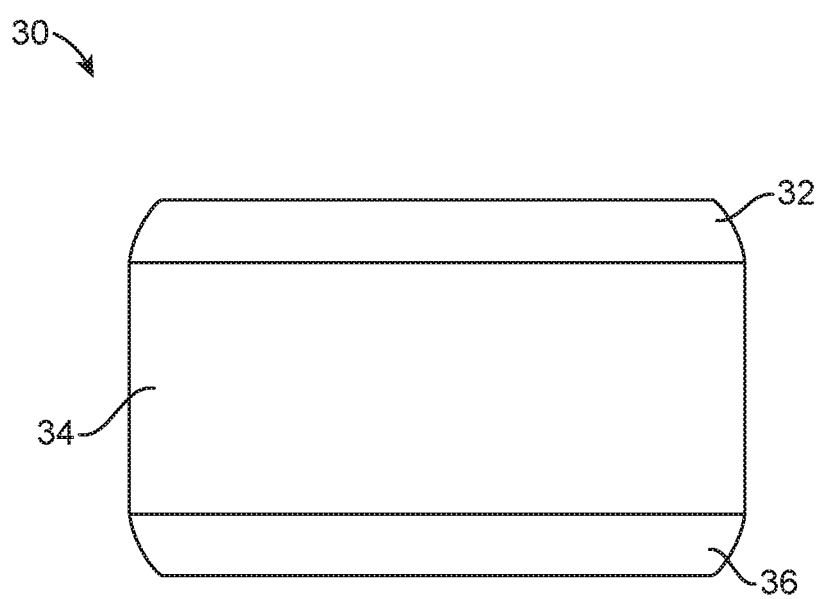
FIG. 5 is a side elevational view of a storage assembly 30, in accordance with one embodiment of the present disclosure.

In another embodiment, the grinder 10 may further comprise a storage assembly 30 to store and/or to transport the particulates of herb, as shown in FIG. 5. Referring to FIG. 5, the storage assembly 30 may be provided as an external unit to the grinder 10. The storage assembly 30 may comprise a top cap 32, a storage unit 34, and a bottom cap 36, each made up of suitable materials e.g., metal or plastic. In this embodiment cap 15 is no longer used and bottom cap 36 is instead used to cap the bottom of the present invention. Referring to FIG. 5, the storage assembly 30 comprising the top cap 32, the storage unit 34, and the bottom cap 36 assembled together is shown, in accordance with one embodiment of the present disclosure. In one example, the storage unit 34 and bottom cap 36 may be threaded at their top portion such that the storage unit 34 is placed on top of the bottom cap 36, and the top cap 32 is placed on the storage unit 34 to form the storage assembly 30.

Figure 6A:
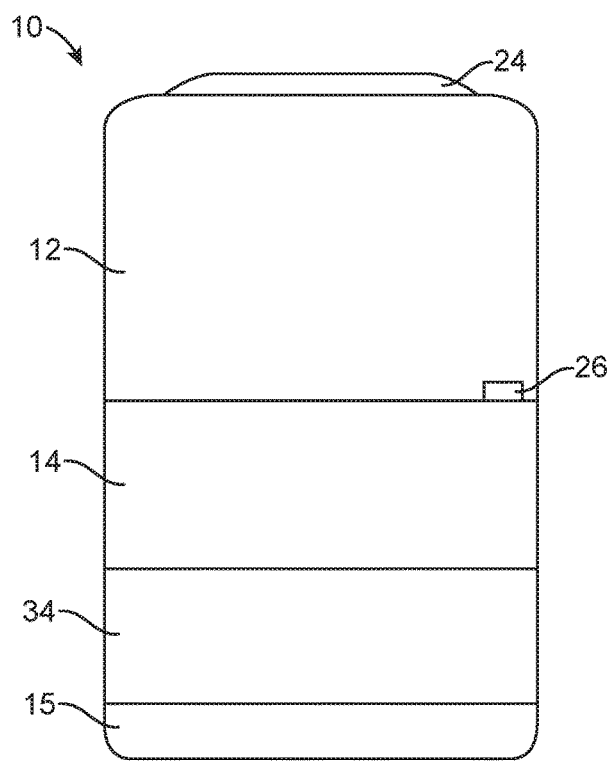
FIG. 6A is a side elevational view of the grinder mounted to storage unit 34, in accordance with one embodiment of the present disclosure.
Figure 6B:
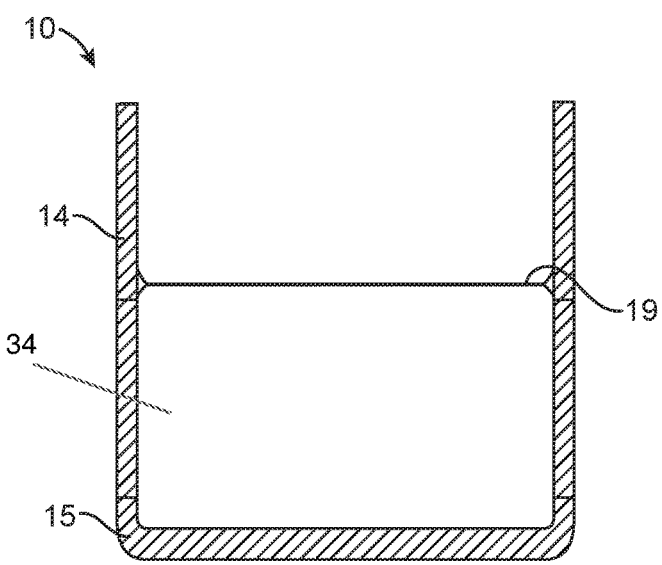
FIG. 6B is a cross-sectional view of the grinder mounted to storage unit 34, in accordance with one embodiment of the present disclosure.

In one embodiment of the present disclosure, the storage assembly 30 may be provided within filter assembly 14 of the grinder 10, such that the finer particulates of the herb upon grinding are collected directly within storage assembly 30. Referring to FIGS. 6A and 6B, the storage assembly 30 of the grinder 10 is shown, in accordance with one embodiment of the present disclosure. Specifically, FIG. 6A shows a side elevational view of the grinder 10 comprising the storage unit 34. Further, FIG. 6B shows a cross-sectional view of the grinder 10 comprising the storage unit 34 within the present invention. As can be seen in FIG. 6B, the storage unit 34 can be provided between the mesh filter 19 and cap 15. In one embodiment, the blade 16 grinds the herb, subsequently, the herb falls onto the mesh filter 19. Subsequently, the finer particulates of the herb fall through the storage unit 34 onto pollen catching cap 15. Subsequently, the storage unit 34 may be removed from filter assembly 14, and the top cap 32 may be used to contain the grinded herb within storage unit 34 in conjunction with either bottom cap 36 or pollen catching cap 15. The storage assembly 30 may then be transported to other places or may be stored on a shelf. In addition, the grinder 10 may be provided with a safety switch (not shown) to prevent the motor 18 from running when the operator's fingers are within body 12, or when filter assembly 14 is removed from body 12.

The grinder 10 may be provided as a portable device such that grinder 10 is easy to carry from one place to another. Further, the grinder 10 may be provided in varied sizes depending upon the material to be grinded. It should be understood that the grinder 10 might be used to grind herbs, spices, coffee beans, tobacco, and other dried plants into particulates. As the lid can be easily detached to take out the herb upon grinding, the problem of putting the grinder upside down is avoided and the herb is collected in full.

In another related embodiment, the present invention can include a scale to weigh the herbs within pollen catching cap 15 or storage assembly 30. The scale can be connected to a mobile application downloaded onto a mobile device so a user can readily monitor the amount of herb being grinded and more specifically control the functions of the grinder such as blade speed, lighting, monitor battery life, usage information, etc. Optionally, the present invention can include a bottle opener and/or a lighter mounted on its surface. Motor 18 can also include a booster chip that increases the RPMs of the motor to permit more powerful and faster grinding.

In the preceding specification, the present disclosure is described with reference to the specific embodiments. However, it will be apparent to a person with ordinary skill in the art that various modifications and changes can be made, without departing from the scope of the present disclosure. Accordingly, the specification and figures are to be regarded as illustrative examples of the present disclosure, rather than in restrictive sense. All such possible modifications are intended to be included within the scope of present disclosure.

What is claimed is:

1. An electric grinder comprising: a body having a motor, a battery, an actuating button, a blade connected to said body using a shaft, a USB charging port that charges said battery; a filter assembly having a top and bottom distal end, a mesh mounted to the filter assembly's bottom distal end; a pollen catching cap member that connects to said filter assembly's bottom end; said body having a lighting member configured to illuminate said filter assembly; said mesh having openings of a dimension that effectively allow the pollen resulting from the grinding of a preselected herb to pass through to said pollen catching cap.

2. The electric grinder subject of claim 1 wherein a removable storage assembly is removably mounted to said filter assembly, said storage assembly including a storage unit, a top cap, and a bottom cap.

3. The electric grinder subject of claim 1 wherein said motor includes a booster chip that increases its RPMs.

4. The electric grinder subject of claim 1 wherein said pollen catching cap member, said filter assembly or said body include a scale that weighs the amount of resulting grinded herb.

5. The electric grinder subject of claim 4 wherein said scale is connected to a mobile application to provide a user with quantitative measurements with respect to the amount of herb being grinded.

6. The electric grinder subject of claim 1 wherein a protective ring is positioned along the circumference of the bottom of said body surrounding said blade.

7. The electric grinder subject of claim 1 having a bottle opener mounted to its outer surface.

8. The electric grinder subject of claim 1 having a lighter mounted to its outer surface.

9. The electric grinder subject of claim 1 wherein said lighting member is an LED.

10. The electric grinder subject of claim 1 having a battery indicator on the outer surface of said body that displays the amount of battery life remaining.

11. The electric grinder subject of claim 1 wherein said mesh is detachable.

12. The electric grinder subject of claim 1 having a sensor that actuates the lighting member upon the lighting in a given area being below a predetermined threshold.

* * * * *